(12) United States Patent
Matsumoto et al.

(10) Patent No.: US 8,335,092 B2
(45) Date of Patent: Dec. 18, 2012

(54) ISOLATED SWITCHING POWER SUPPLY APPARATUS

(75) Inventors: Tadahiko Matsumoto, Otsu (JP); Tatsuya Hosotani, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/205,657

(22) Filed: Aug. 9, 2011

(65) Prior Publication Data
US 2011/0292691 A1    Dec. 1, 2011

Related U.S. Application Data

(63) Continuation of application No. PCT/JP2009/065574, filed on Sep. 7, 2009.

(30) Foreign Application Priority Data

Feb. 13, 2009 (JP) ................................. 2009-030803

(51) Int. Cl.
*H02M 3/335* (2006.01)

(52) U.S. Cl. ........................................ 363/21.07; 363/16

(58) Field of Classification Search .................. 363/16, 363/17, 20, 21.05, 21.07, 21.08, 21.15, 80, 363/89, 97, 126, 54, 61; 323/282–288, 222, 323/326, 348, 300
See application file for complete search history.

(56) References Cited

U.S. PATENT DOCUMENTS

| | | | |
|---|---|---|---|
| 4,315,305 A * | 2/1982 | Siemon | 363/88 |
| 4,465,966 A * | 8/1984 | Long et al. | 323/348 |
| 6,147,478 A | 11/2000 | Skelton et al. | |
| 6,563,718 B1 * | 5/2003 | Li et al. | 363/16 |
| 7,773,392 B2 * | 8/2010 | Matsumoto | 363/21.07 |
| 7,872,561 B2 * | 1/2011 | Matumoto | 336/200 |
| 2007/0153554 A1 | 7/2007 | Matsumoto | |
| 2008/0253149 A1 | 10/2008 | Matumoto | |

FOREIGN PATENT DOCUMENTS

| | | |
|---|---|---|
| EP | 0 505 982 A1 | 9/1992 |
| JP | 04-299070 A | 10/1992 |
| JP | 2002-333653 | * 11/2002 |
| JP | 2002-333653 A | 11/2002 |
| JP | 2006-006057 | * 1/2006 |
| JP | 2006-006057 A | 1/2006 |

OTHER PUBLICATIONS

Official Communication issued in International Patent Application No. PCT/JP2009/065574, mailed on Nov. 17, 2009.

* cited by examiner

*Primary Examiner* — Rajnikant Patel
(74) *Attorney, Agent, or Firm* — Keating & Bennett, LLP (57) ABSTRACT

In an ON/OFF type isolated DC-DC converter that stores electromagnetic energy in a main transformer during an ON period of a power switch and releases the electromagnetic energy to an output during an OFF period of the power switch, high-speed, highly stable output voltage control without the need for a photocoupler, for which the allowable temperature range is relatively narrow and the current transfer ratio changes over time, is performed. An integrating circuit including a resistor and a capacitor generates a ramp wave, and the ramp wave is superposed on a reference voltage of a reference voltage source Vref through a capacitor. A comparator compares a voltage Vo that is proportional to an output voltage of a converter with the reference voltage on which the ramp wave has been superposed, and transmits an inversion timing signal through a pulse transformer. During an ON period of a power switch, when the voltage Vo that is proportional to the output voltage exceeds the reference voltage on which the ramp wave has been superposed, the comparator is inverted and the power switch is turned OFF.

11 Claims, 8 Drawing Sheets

FIG. 5A
Q1 G-S VOLTAGE

FIG. 5B
Q1 D-S VOLTAGE

FIG. 5C
Q1 DRAIN CURRENT

FIG. 5D
Q2 G-S VOLTAGE

FIG. 5E
Q2 DRAIN CURRENT

FIG. 5F
RctD2 CURRENT

FIG. 5G
RctD2 VOLTAGE

FIG. 5H
COMP INPUT VOLTAGE

FIG. 5I
COMP OUTPUT VOLTAGE

FIG. 5J
T2 INPUT/OUTPUT VOLTAGE

FIG. 5K
ZVdt OUTPUT VOLTAGE

FIG. 5L
INV1 INPUT VOLTAGE

FIG. 8A Q1 G-S VOLTAGE

FIG. 8B Q1 D-S VOLTAGE

FIG. 8C Q1 DRAIN CURRENT

FIG. 8D Q2 G-S VOLTAGE

FIG. 8E Q2 DRAIN CURRENT

FIG. 8F n1 CURRENT AT T1

FIG. 8G Rct CURRENT

FIG. 8H Rct VOLTAGE

FIG. 8I COMP INPUT VOLTAGE

FIG. 8J COMP OUTPUT VOLTAGE

FIG. 8K T2 INPUT/OUTPUT VOLTAGE

FIG. 8L ZVdt OUTPUT VOLTAGE

FIG. 8M INV1 INPUT VOLTAGE

ISOLATED SWITCHING POWER SUPPLY APPARATUS

BACKGROUND OF THE INVENTION

1. Field of the Invention

The present invention relates to an isolated switching power supply apparatus that includes a main transformer that transmits power from a primary side to a secondary side and a power switch that interrupts a current flowing from a DC input power supply to a primary coil of the main transformer, and that outputs a desired DC voltage or DC current.

2. Description of the Related Art

Figure 1:
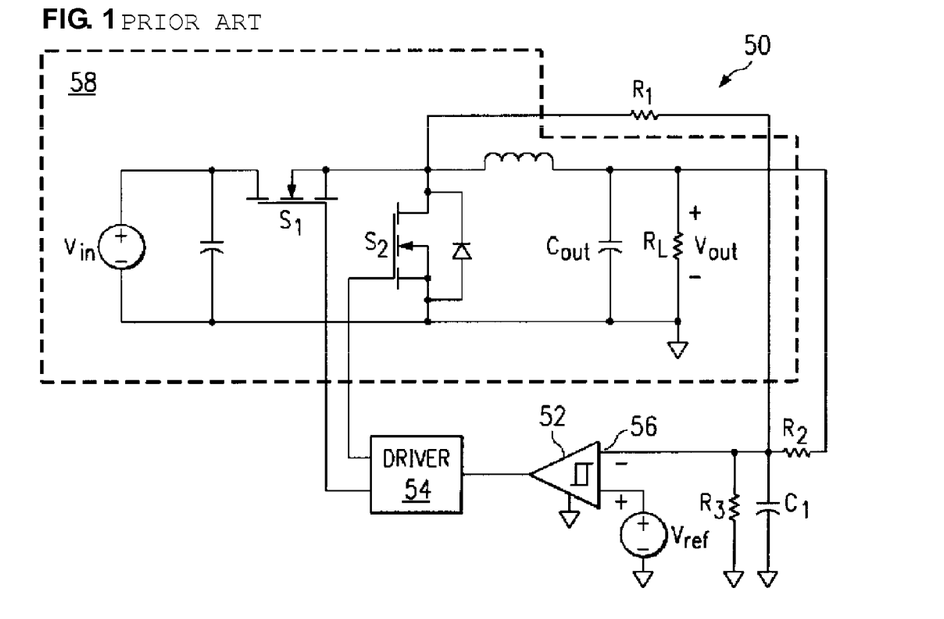
FIG. 1 is a schematic circuit diagram of a DC-DC converter disclosed in U.S. Pat. No. 6,147,478.

FIG. 1 is a schematic circuit diagram of a DC-DC converter 58 described in U.S. Pat. No. 6,147,478. The DC-DC converter 58 is a circuit that is connected to a DC input power supply Vin and outputs a voltage to a load resistor R1. The DC-DC converter 58 includes a first power switch S1, a synchronous rectifier S2, an output smoothing capacitor Cout, resistors R1, R2 and R3, a capacitor C1, a comparator 52 having a hysteresis characteristic, and a power switch driving circuit 54.

The DC-DC converter described in U.S. Pat. No. 6,147,478 is a step-down converter that employs an improved control method of a general "hysteresis control method". The hysteresis control method is a control method that compares an output voltage with a reference voltage by using a comparator having a hysteresis characteristic to determine the ON/OFF state of the power switch S1, and performs a switching operation by using output voltage variations due to ripples.

With a hysteresis width being denoted as HYS, when the output voltage increases due to a ripple during an ON period of S1 and exceeds reference voltage+(½)HYS, S1 is turned OFF and S2 is turned ON. When the output voltage decreases due to a ripple and falls below reference voltage−(½)HYS, S1 is turned OFF again and S2 is turned ON.

Such a DC-DC converter using a hysteresis control method has a simple control circuit configuration and an improved transient responsiveness because there is no phase delay in an error amplifier.

On the other hand, a general hysteresis control method has a disadvantage in that the general hysteresis control method is greatly dependent on ripples caused by a switching operation. As the capacitance of an output smoothing capacitor of a DC-DC converter is increased, ripples become small and the switching frequency is lowered. In addition, when ripples are too small, the control may become unstable due to the influence of noise, and as a result, the general hysteresis control method cannot be used in applications that require ripples to be of a strict standard value. Furthermore, when a low ESR capacitor such as a ceramic capacitor is used as an output smoothing capacitor, a ripple has a voltage waveform that is close to a sinusoidal wave pattern having a π/2 phase delay, rather than a ramp wave pattern, and thus the gain is reversed at the beginning of an ON period of a power switch (that is, at the time when the power switch is turned ON, the output voltage on the secondary side is changed to a falling direction), and thereby stable control cannot be performed.

Instead of using a hysteresis characteristic of a comparator, so-called "Bang-Bang control" using response delay times td1 and td2 of a comparator is also generally known. In the Bang-Bang control, during an ON period of S1, after a first response delay td1 after the output voltage has increased due to a ripple and exceeded a reference voltage, a power switch S1 is turned OFF (a synchronous rectifier S2 is turned ON), and after a second response delay td2 after the output voltage has decreased and fallen below the reference voltage, the power switch S1 is again turned OFF (the synchronous rectifier S2 is turned ON).

The Bang-Bang control has an advantage in that there is an improved transient responsiveness but the Bang-Bang control has the same problem as the hysteresis control method, which is the disadvantage of being greatly dependent on ripples in a switching operation.

In the DC-DC converter of U.S. Pat. No. 6,147,478, a ramp wave is formed by an integrating circuit composed of the resistor R1 and the capacitor C1 and an output voltage is superposed on a voltage divided between the resistors R2 and R3 to solve the foregoing problem. Thus, stable control is possible even when the ripple voltage is reduced due to the capacitance of the output smoothing capacitor having been increased or even when a low ESR capacitor is used as the output smoothing capacitor.

Despite the advantages described above, the hysteresis control system and the Bang-Bang control system have only been applied to step-down converters which are ON/ON type non-isolated DC-DC converters (forward DC-DC converters) due to the following reasons.

In ON/OFF type DC-DC converters (flyback DC-DC converters), electromagnetic energy is stored in an inductor or an exciting inductance of a main transformer during an ON period of a power switch, and the stored electromagnetic energy is released to a smoothing circuit through a rectifier during an OFF period of the power switch. Since the ripple voltage in the output smoothing capacitor decreases during the ON period and increases during the OFF period, the gain is reversed in the hysteresis control method and the Bang-Bang control method, and thereby stable control cannot be performed. That is, because there is a relationship where the output voltage on the secondary side of the main transformer decreases during an ON period of the power switch, the control direction is inverted, and thereby control becomes difficult.

Furthermore, in ON/OFF type isolated DC-DC converters in which the primary side and the secondary side are isolated from each other by a transformer, it is necessary to provide a comparator, which compares an output voltage with a reference voltage, on the secondary side of a main transformer and provide a power switch on the primary side thereof, and thus the comparator and the power switch are separated from each other with the main transformer therebetween.

For these reasons, there is a problem in that the hysteresis control method and the Band-Band control method cannot be applied to ON/OFF type isolated DC-DC converters.

Furthermore, feedback control in a voltage mode and a current mode, which are general modes in ON/OFF type isolated DC-DC converters, has many problems such as an inferior response compared to that in the hysteresis control method and the Bang-Bang control method, and a photocoupler used in transmission of error signals from the secondary side to the primary side, having pronounced transmission delay of signals, limitation of the maximum allowable temperature to approximately 100° C., and a current transfer ratio that changes over time.

In ON/OFF type isolated DC-DC converters, after all the electromagnetic energy stored in the main transformer is released to a smoothing circuit through a rectifier, a zero voltage state or a near-zero voltage state (quasi-zero voltage state) occurs due to LC resonance between the exciting inductance of the main transformer and the parasitic capacitance parallel to the power switch. When the power switch is turned ON at this timing, the switching becomes zero voltage switching (ZVC) or quasi-zero voltage switching, enabling a reduction in switching loss and noise. However, since the hysteresis control method and the Bang-Bang control method determine the turn ON timing of the power switch by comparing the output voltage with the reference voltage, zero voltage switching cannot be realized in an ON/OFF type DC-DC converter, even if the hysteresis control method or the Bang-Bang control method can be applied thereto. As a result, there is a problem that causes an increase in switching loss and noise.

SUMMARY OF THE INVENTION

Accordingly, preferred embodiments of the present invention provide an isolated switching power supply apparatus in which an ON/OFF type isolated DC-DC converter storing electromagnetic energy in a main transformer during an ON period of a power switch and releasing the electromagnetic energy to an output during an OFF period of the power switch does not use a photocoupler for which the allowable temperature range is relatively narrow and the current transfer ratio changes over time, performs high-speed, highly stable output voltage control, and further allows zero voltage switching of the power switch to reduce switching loss and noise.

According to a preferred embodiment of the present invention, an isolated switching power supply apparatus includes a main transformer that includes a primary coil and a secondary coil and that transmits power from a primary side to a secondary side, at least one power switch that is connected in series to the primary coil of the main transformer and that interrupts a current flowing from a DC input power supply to the primary coil of the main transformer, a rectifier that rectifies a voltage generated in the secondary coil of the main transformer, and a smoothing circuit that smoothes the voltage rectified by the rectifier, wherein energy is stored in the main transformer during an ON period of the power switch and the stored energy is released to the secondary side during an OFF period of the power switch, the isolated switching power supply apparatus including a ramp wave generating circuit that generates a ramp wave based on a change of magnetic flux generated in the main transformer; a comparing device that compares the ramp wave with a reference voltage or compares a reference voltage on which the ramp wave is superposed with an output voltage which has been smoothed by the smoothing circuit, and outputs a timing signal for inverting a magnitude relation; a timing signal transmitter that transmits the timing signal output from the comparing device from the secondary side to the primary side; and a switching controller that controls a turn-off timing of the power switch by using the timing signal transmitted by the timing signal transmitter to control an ON time of the power switch.

With the above described configuration, a relationship can be established such that a voltage subjected to comparison with respect to a ramp wave decreases as the output voltage decreases and the voltage subjected to comparison with respect to a ramp wave increases as the output voltage increases. Thus, a timing signal for turning the power switch OFF can be generated during an ON time of the power switch, and thereby stabilization control of the output voltage on the secondary side of the main transformer can be stably performed.

The timing signal transmitter preferably is a pulse transformer including a primary coil and a secondary coil.

Accordingly, there is no need to use a photocoupler, and thus an isolated switching power supply apparatus that has a wide allowable temperature range and a small current transfer ratio change over time can be formed.

The ramp wave generating circuit preferably includes an integrating circuit that integrates the voltage generated in the secondary coil of the main transformer or a voltage generated between both ends of the rectifier.

Accordingly, the slope of the ramp wave becomes substantially proportional to the output voltage, and thus a feedforward effect is produced, thereby improving the responsiveness, output voltage accuracy and noise resistance.

If needed, a ramp wave correction circuit is provided that generates an error amplification signal by amplifying an error voltage between the output voltage of the smoothing circuit and a predetermined reference voltage and superposes the error amplification signal on the ramp wave generated by the ramp wave generating circuit.

Accordingly, a static output voltage accuracy is improved.

The switching controller preferably includes a zero voltage switching control element that detects a timing at which a voltage between both ends of the power switch decreases to zero voltage or near zero voltage after the power switch has been turned OFF and the electromagnetic energy stored in the main transformer has been released, and turns the power switch ON.

Accordingly, the power switch is turned ON in a zero voltage state, and thereby a switching loss and noise are reduced.

A series circuit including a capacitor and a switching element including a control terminal is connected in parallel to the primary coil of the main transformer or the power switch, and A voltage clamp circuit is provided that repeatedly turns ON and OFF in a complementary manner with an OFF period of both the power switch and the switching element therebetween and, immediately after the power switch is turned OFF, absorbs a surge voltage generated between main current carrying terminals of the power switch with the capacitor to regenerate the absorbed energy.

Accordingly, a high efficiency characteristic can be obtained since a transistor having a low withstand voltage can be used as the power switch and the electromagnetic energy of the main transformer absorbed with the capacitor is regenerated.

The capacitor included in the series circuit is connected in series to the primary coil of the main transformer, and is repeatedly charged and discharged, or discharged and charged, in synchronization with an ON/OFF operation of the switching element.

Accordingly, the voltage applied to the power switch can be reduced by a voltage generated between both ends of the capacitor, and thereby a switch having a lower withstand voltage can be used.

The main transformer is provided with a switching element driving wiring, and the switching controller is provided with a switching element driving circuit that inputs a voltage generated in the switching element driving wiring, the voltage being substantially proportional to the voltage generated in the primary coil, to the switching element having the control terminal to control ON/OFF thereof.

Accordingly, the voltage clamp circuit can be automatically driven in accordance with magnetic changes of the transformer.

The switching element driving circuit includes a switching element that turns the switching element having the control terminal OFF, and a time constant circuit that performs control so that the switching element having the control terminal is turned OFF by the switching element after a certain time elapses after a voltage substantially proportional to a voltage of the primary coil which turns the switching element including the control terminal OFF has been generated in the switching element driving wiring.

Accordingly, a driving time for the voltage clamp circuit can be set to any value by using circuit constants of the time constant circuit.

One of the unique features of the isolated switching power supply apparatus is that the switching element includes a transistor, the transistor is connected to the control terminal of the switching element including the control terminal, and an impedance circuit and a capacitor constituting the time constant circuit are connected to a control terminal of the transistor.

Accordingly, a circuit that determines the driving time of the voltage clamp circuit can be realized at low cost.

The rectifier is a switching element that is switched by a control signal.

Accordingly, forward loss can be reduced compared to the case of using a diode, and the circuit efficiency can be enhanced.

According to various preferred embodiments of the present invention, the ON/OFF type isolated DC-DC converter, which stores electromagnetic energy in the main transformer during an ON period of a power switch and releases the electromagnetic energy to an output during an OFF period of the power switch, does not need a photocoupler for which the allowable temperature range is relatively narrow and the current transfer ratio changes over time, and can perform high-speed, highly stable output voltage control. Furthermore, by enabling zero voltage switching of the power switch, an isolated switching power supply apparatus that reduces switching loss and noise can be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 2:
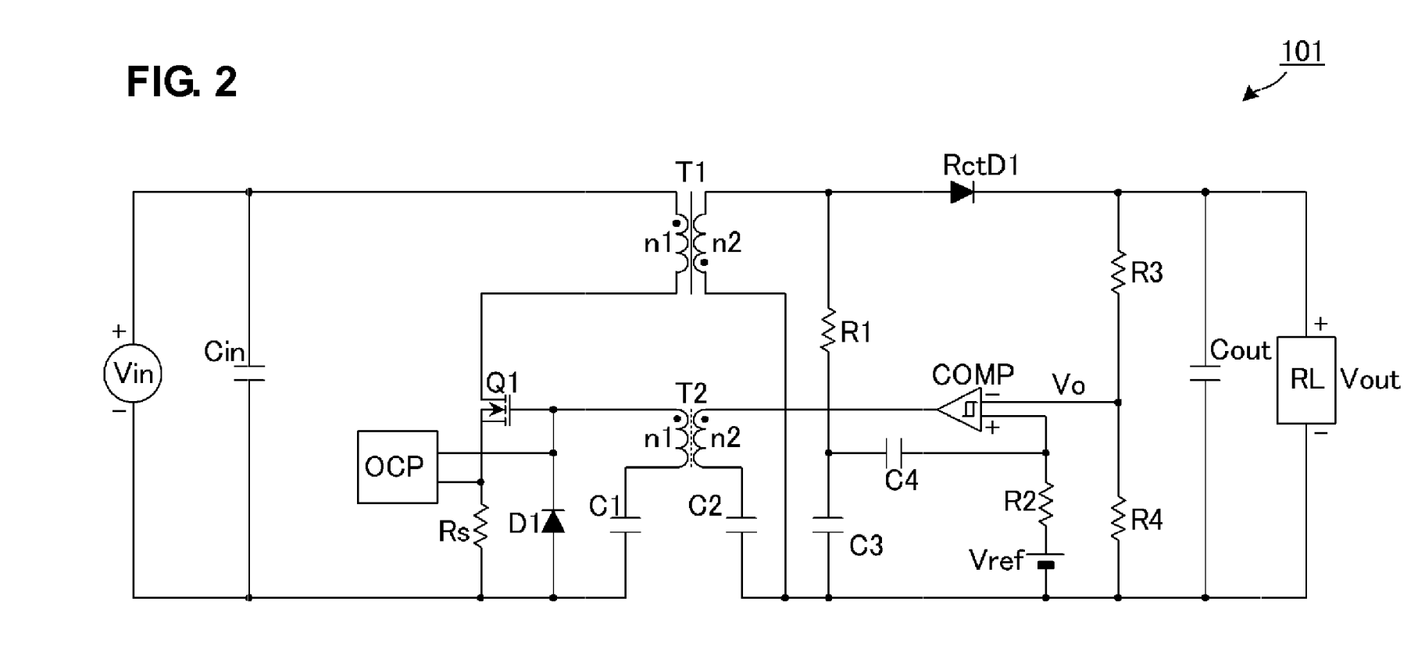
FIG. 2 is a circuit diagram of an isolated switching power supply apparatus 101 according to a first preferred embodiment of the present invention.

FIG. 2 is a circuit diagram of an isolated switching power supply apparatus 101 according to a first preferred embodiment. FIGS. 3A-3I are waveform diagrams for each section thereof.

The isolated switching power supply apparatus 101 in FIG. 2 preferably is an ON/OFF type isolated DC-DC converter (flyback DC-DC converter), for example. The isolated switching power supply apparatus 101 is connected to a DC input power supply Vin and supplies a predetermined constant voltage to a load RL.

A power converting section of the isolated switching power supply apparatus 101 includes an input smoothing capacitor Cin, a power switch Q1, a main transformer T1 for power transmission, a rectifier diode RctD1, and an output smoothing capacitor Cout defining a smoothing circuit.

A control section of the isolated switching power supply apparatus 101 includes an overcurrent protection circuit OCP, a current detection resistor Rs, a diode D1, capacitors C1, C2, C3 and C4, a pulse transformer T2 for timing signal transmission, a comparator COMP having a hysteresis characteristic, a reference voltage source Vref, and resistors R1, R2, R3 and R4.

Next, a circuit operation of the isolated switching power supply apparatus 101 illustrated in FIG. 2 is described with reference to FIGS. 3A-3I.

Figure 3A:
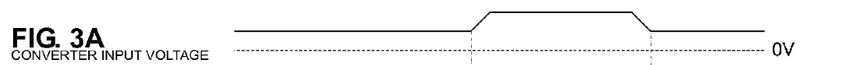
FIGS. 3A-3I are waveform diagrams for each section of the isolated switching power supply apparatus 101 according to the first preferred embodiment of the present invention.
Figure 3B:
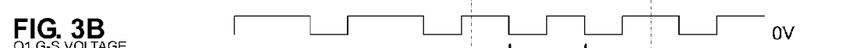
Figure 3C:
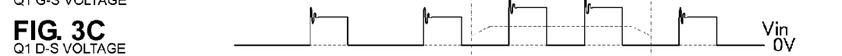
Figure 3D:
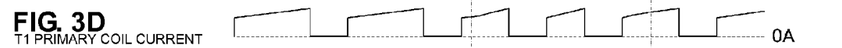
Figure 3E:
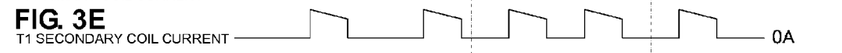
Figure 3F:
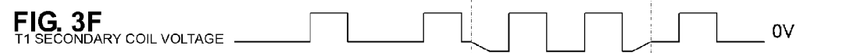

First, in a power conversion operation, a DC power input from the DC input power supply Vin is switched by the power switch Q1 and converted into an AC power. When the power switch Q1 is turned ON, a current illustrated in FIG. 3D flows in a primary coil n1 of the main transformer T1 and electromagnetic energy is stored in an exciting inductance. At a time t0, when the power switch Q1 is turned OFF, the voltage between a drain and a source (hereinafter expressed as "D-S") of Q1 and the voltage of the main transformer T1 are reversed as illustrated in FIGS. 3C and 3F, the rectifier diode RctD1 becomes conductive and a current illustrated in FIG. 3E flows, and the electromagnetic energy stored in the main transformer T1 is released to the smoothing circuit. An output of the rectifier diode RctD1 is smoothed by the output smoothing capacitor Cout, converted into a DC power, and supplied to the load RL.

In an operation of the control section, an output voltage of the converter is divided between the resistors R3 and R4, and a "voltage substantially proportional to the output voltage" Vo is input to a (−)input of the comparator COMP. Meanwhile, a voltage of a secondary coil n2 of the main transformer T1 is integrated through the resistor R1 and the capacitor C3 to form a ramp wave, and the AC component thereof is superposed on a voltage (reference voltage) of the reference voltage source Vref through the capacitor C4 and input to a (+)input of the comparator COMP.

An integrating circuit including the resistor R1 and the capacitor C3 corresponds to the "ramp wave generating circuit" based on the change of magnetic flux generated in the main transformer.

The comparator COMP has a hysteresis characteristic of a hysteresis width Hys. When a COMP (+)input voltage exceeds Vo+(½)Hys, a COMP output is inverted from an L level to an H level. When a COMP (+)input voltage falls below Vo−(½)Hys, the COMP output is inverted from the H level to the L level. This comparator COMP corresponds to the "comparing device" according to a preferred embodiment of the present invention.

The output voltage of the comparator COMP is added between a gate and a source (hereinafter expressed as "G-S") of the first power switch Q1 through the pulse transformer T2. When the output voltage of the comparator COMP is at the H level, Q1 is turned ON. When the output voltage of the comparator COMP is at the L level, Q1 is turned OFF. The pulse transformer T2 corresponds to the "timing signal transmitter" according to a preferred embodiment of the present invention, which transmits an inverse timing signal of the comparator COMP from the secondary side to the control circuit on the primary side.

Figures 3G, 3H:
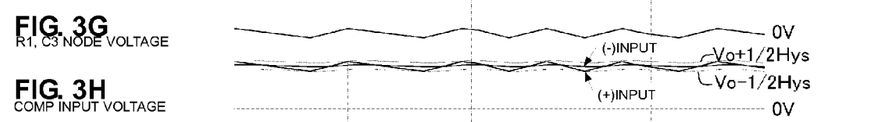
Figure 3I:
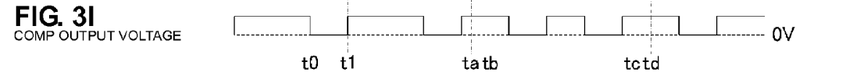

As described above, at the moment the (+)input voltage of the comparator COMP exceeds Vo+(½)Hys, the output of the comparator COMP is inverted from the L level to the H level and the first power switch is turned ON. However, during an ON period of the power switch, a ramp wave voltage is gradually decreased as illustrated in FIG. 3G, and thus the (+)input voltage of the comparator COMP falls below Vo−(½)Hys after a certain period, and the output of the comparator COMP is inverted from the H level to the L level and the power switch Q1 is turned OFF. During an OFF period of the power switch Q1, the ramp wave voltage is gradually increased, and thus the (+)input voltage of the comparator COMP exceeds Vo+(½)Hys after a certain period, and the output of the comparator COMP is inverted from the L level to the H level and the power switch Q1 is turned ON.

Since a ripple voltage of the converter output is superposed on the (−)input voltage Vo of the comparator COMP, Vo is gradually decreased during an ON period of the power switch Q1, and Vo is gradually increased during an OFF period of the power switch Q1. However, by setting the amplitude of the ramp wave superposed on the (+)input voltage of the comparator COMP to be larger than the ripple voltage superposed on Vo, the influence of the ramp wave becomes dominant. That is, after the power switch Q1 is turned ON, the (−)input voltage Vo of the comparator COMP is changed to a falling direction, however, since the (+)input voltage of the comparator COMP is changed to a direction of greater falling, the "gain reversal" described above is avoided. Therefore, stable control is possible.

The circuit including the pulse transformer T2, the capacitor C1 and the diode D1 of the isolated switching power supply apparatus 101 illustrated in FIG. 2 corresponds to the "switching controller" according to a preferred embodiment of the present invention.

Time ta to tb in FIGS. 3A-3I indicates a sharp increase in the input voltage and time tc to td indicates a sharp decrease in the input voltage. Since an output voltage variation due to such an input voltage variation is instantly reflected in the switching operation, that is, since the ON time of the power switch Q1 is immediately changed, transient responsiveness is excellent as in the hysteresis control method. In addition, since the slope of a ramp wave during an ON period of the power switch Q1 is proportional to the input voltage, a feedforward effect with respect to an input voltage variation is produced, thereby improving the responsiveness, output voltage accuracy and noise resistance.

In hysteresis control, an ON period of the power switch Q1 continues until the voltage, which is substantially proportional to the output voltage, exceeds the reference voltage. However, in an ON/OFF type isolated DC-DC converter, a prolonged ON period causes saturation of the main transformer T1 and therefore an overcurrent flows. This may cause breakdown of a component. In the first preferred embodiment, the current detection resistor Rs monitors a current in the primary coil of the main transformer T1, and, when the current becomes excessive, the overcurrent protection circuit OCP turns OFF the power switch Q1. This prevents magnetic saturation in the main transformer T1.

Since the isolated switching power supply apparatus 101 according to the first preferred embodiment is operated in a current continuous mode and the next ON period starts before all the electromagnetic energy stored in the main transformer T1 is released, a zero voltage state due to LC resonance between the exciting inductance of the main transformer T1 after all the electromagnetic energy has been released and the parasitic capacitance parallel to the power switch Q1 does not occur. Therefore, the power switch Q1 performs a hard switching operation, instead of a zero voltage switching operation.

Second Preferred Embodiment

Figure 4:
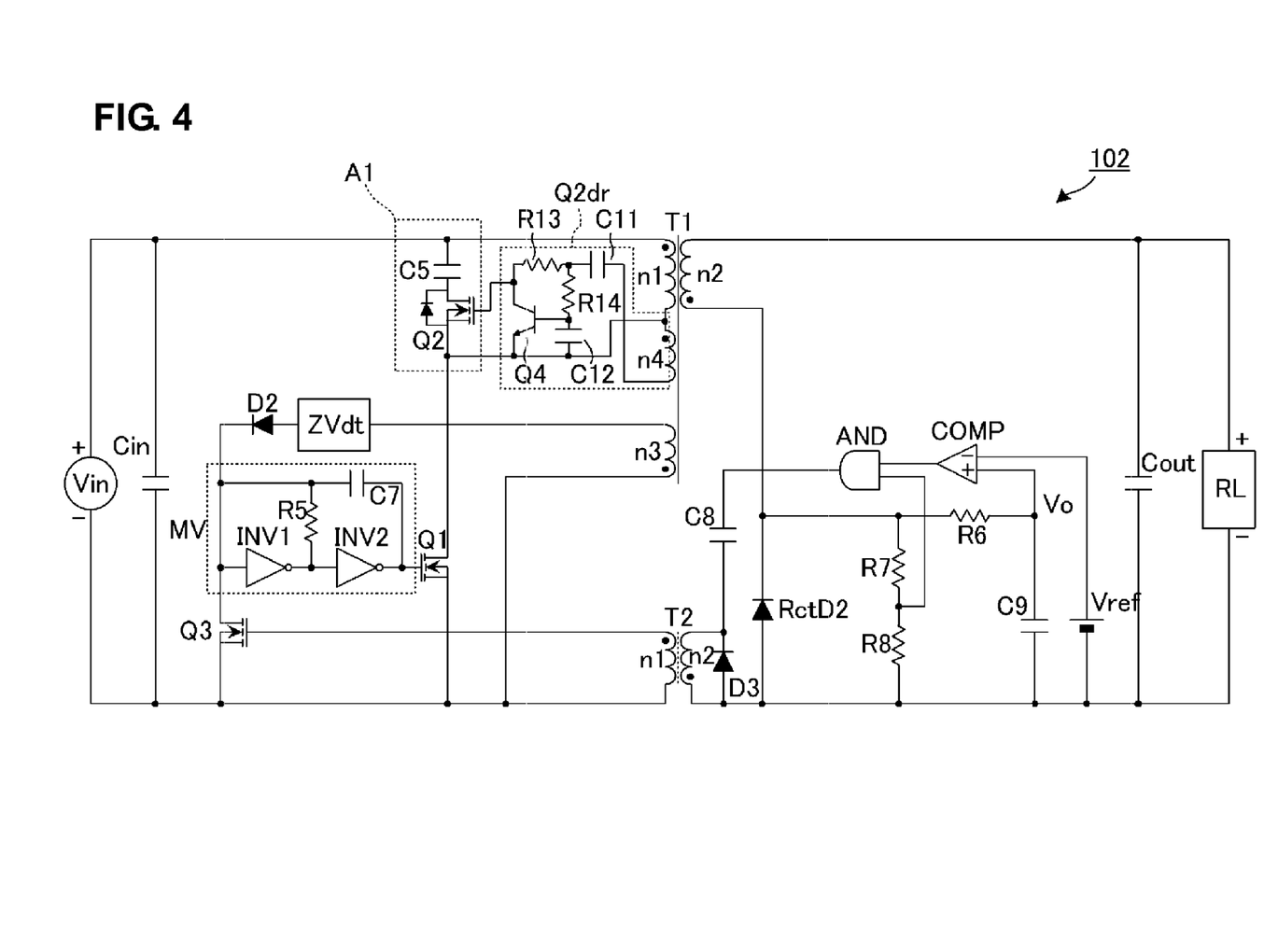
FIG. 4 is a circuit diagram of an isolated switching power supply apparatus 102 according to a second preferred embodiment of the present invention.

FIG. 4 is a circuit diagram of an isolated switching power supply apparatus 102 according to a second preferred embodiment. In addition, FIGS. 5A-5L are waveform diagrams for each section thereof.

The isolated switching power supply apparatus 102 in FIG. 4 preferably is an ON/OFF type isolated DC-DC converter (flyback DC-DC converter), for example. The isolated switching power supply apparatus 102 is connected to a DC input power supply Vin and supplies a predetermined constant voltage to a load RL.

A power converting section of the isolated switching power supply apparatus 102 includes an input smoothing capacitor Cin, a first power switch Q1, a second power switch Q2, a clamp capacitor C5, a main transformer T1 for power transmission, a rectifier diode RctD2, and an output smoothing capacitor Cout forming a smoothing circuit.

A control section of the isolated switching power supply apparatus 102 includes a Q2 driving circuit Q2dr, a zero-voltage detection circuit ZVdt, diodes D2 and D3, a multivibrator MV, inverters INV1 and INV2, capacitors C7, C8 and C9, resistors R5, R6, R7 and R8, a switching element Q3, a pulse transformer T2 for timing signal transmission, an AND gate AND, a comparator COMP defining the comparing device, and a reference voltage source Vref.

Next, a circuit operation of the isolated switching power supply apparatus 102 illustrated in FIG. 4 is described with reference to FIGS. 5A-5L.

Figures 5A, 5B, 5C, 5D, 5E:
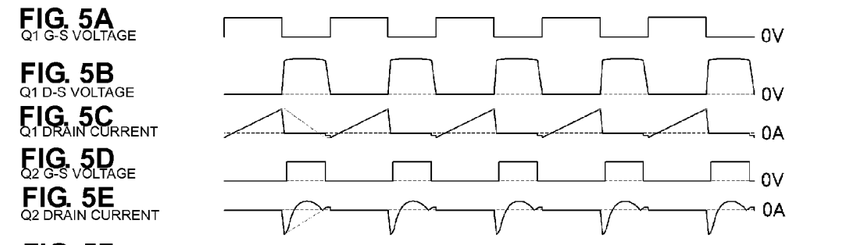
FIGS. 5A-5L are waveform diagrams for each section of the isolated switching power supply apparatus 102 according to the second preferred embodiment of the present invention.
Figures 5F, 5G:
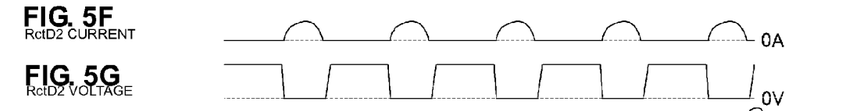
Figure 5H:
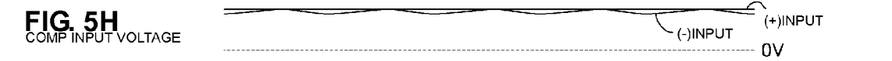

First, in a power conversion operation, a DC power input from the DC input power supply Vin is switched by the first power switch Q1 and converted into an AC power. When the first power switch Q1 is turned ON, a current which increases in a linear fashion as illustrated in FIG. 5C flows in a primary coil n1 of the main transformer T1 and electromagnetic energy is stored in an exciting inductance. When the first power switch Q1 is turned OFF, the D-S voltage of Q1 and the voltage of the main transformer T1 are reversed as illustrated in FIGS. 5B and 5G, and a parasitic diode of the second power switch Q2 and the rectifier diode RctD1 conduct to each other. The total exciting current of the main transformer T1 decreases in a linear fashion as illustrated in FIGS. 5C and 5E as dashed lines. However, since the exciting current is divided between the second power switch Q2 and the rectifier diode RctD2, the respective currents have waveforms illustrated in FIGS. 5E and 5F. Through the rectifier diode RctD2, the electromagnetic energy stored in the main transformer T1 is smoothed by the output smoothing capacitor Cout, converted into a DC power, and supplied to the load RL.

A large current flows into a voltage clamp circuit A1 formed of the second power switch Q2 and the clamp capacitor C5, especially immediately after the transformer voltage of the main transformer T1 is reversed. Therefore, a surge voltage occurring immediately after the first power switch Q1 is turned OFF at both ends (between main current carrying terminals) of the first power switch Q1 due to a leakage inductance of the main transformer T1 is absorbed. Then, the voltage clamp circuit A1 regenerates the absorbed energy at the input/output of the converter by LC resonance between the exciting inductance of the main transformer T1 and the capacitor C5. The second power switch Q2 corresponds to the "switching element" according to a preferred embodiment of the present invention.

In the control section on the primary side, the inverters INV1 and INV2, the capacitor C7 and the resistor R5 constitute the multivibrator MV. With an oscillation operation of this multivibrator MV, the first power switch Q1 is driven. The zero-voltage detection circuit ZVdt connected to a third coil n3 of the main transformer T1 generates a trigger signal illustrated in FIG. 5K when detecting a zero voltage state or a near-zero voltage state (quasi-zero voltage state) that occurred after all the electromagnetic energy stored in the main transformer has been released. This trigger signal is added to an input of INV1 of the multivibrator MV through the diode D2, thereby inverting the multivibrator MV to turn the first power switch Q1 ON.

When a period of the resonance between the exciting inductance of the main transformer T1 and the parasitic capacitance existing parallel to the first power switch Q1 is denoted as Tr, a voltage at both ends of the first power switch Q1 becomes minimum after (¼)Tr seconds after an output voltage of the third coil n3 of the main transformer T1 has decreased to AC 0 V (zero cross). Therefore, when the first power switch Q1 is turned ON after a delay time corresponding to (¼)Tr has elapsed after an AC 0 V state detection, zero voltage switching or quasi-zero voltage switching can be realized. The zero-voltage detection circuit ZVdt corresponds to the "zero voltage switching controller" according to a preferred embodiment of the present invention.

The main transformer T1 is provided with a fourth coil n4 corresponding to the "switching element driving wiring" according to a preferred embodiment of the present invention. A voltage of this fourth coil n4 is applied to the Q2 driving circuit Q2dr corresponding to the "switching element driving circuit" according to a preferred embodiment of the present invention. The Q2 driving circuit Q2dr includes a delay circuit defined by a series circuit that includes a resistor R13 and a capacitor C11 connected in series to the fourth coil n4, a transistor Q4 which is switching element that turns OFF the second power switch Q2, and a time constant circuit that includes a resistor R14, which is an impedance circuit connected to a control terminal (base) of the transistor Q4, and a capacitor C12, which is charged and discharged.

Immediately after the transformer voltage of the main transformer T1 is reversed, the voltage of the wiring n4 turns Q2 ON. At the same time, charges are accumulated in the capacitor C12 through the resistor R14. When the charges reach a voltage that is sufficient to turn Q4 ON, Q4 is turned ON, and a gate potential of Q2 is forcibly reduced to turn Q2 OFF.

In this way, the Q2 driving circuit Q2dr performs control so as to turn ON Q2 immediately after the transformer voltage of the main transformer T1 is reversed, and turn OFF when a current flowing through the second power switch Q2 becomes zero or near zero after a certain period of time after the turning ON. This causes the switching element Q2 to perform a zero-current turn-off operation, thereby reducing both a switching loss and a switching surge occurring at the turnoff time.

The Q2 driving circuit Q2dr can be configured with a simple driving circuit since there is no need to exchange signals with a circuit that drives the first power switch Q1.

On the other hand, in the control section on the secondary side, a voltage at both ends of the rectifier diode RctD2 is integrated through the resistor R6 and the capacitor C9, and the integrated voltage Vo is input to a (+)input of the comparator COMP. The integrated voltage contains a ramp wave shaped ripple. The average value of the integrated voltage is a value obtained by subtracting a voltage drop caused by the secondary coil n2 of the transformer T1 from the output voltage of the converter, thus is a "voltage substantially proportional to the output voltage", and includes a ramp wave component which gradually increases during an ON period of the first power switch Q1 and gradually decreases during an OFF period of the first power switch Q1.

The integrated circuit including the resistor R6 and the capacitor C9 corresponds to the "ramp wave generating circuit" according to a preferred embodiment of the present invention.

Figure 5I:
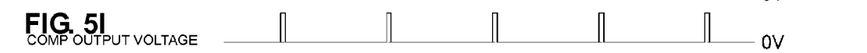
Figures 5J, 5K, 5L:
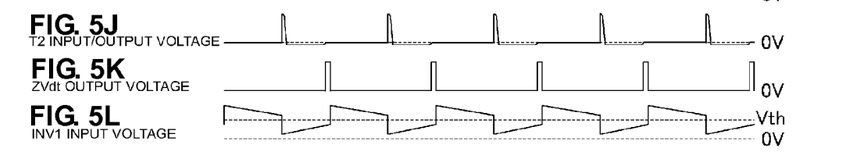

The integrated voltage is compared with the voltage (reference voltage) of the reference voltage source Vref by the comparator COMP. When the integrated voltage is larger than the reference voltage, as illustrated in FIG. 5I, the output voltage of the comparator COMP becomes the H level. When the integrated voltage is smaller than the reference voltage, the output voltage of the comparator COMP becomes the L level.

A voltage obtained by dividing the voltage between the ends of the rectifier diode RctD2 by the resistors R7 and R8 is a voltage signal used to detect an ON period of the first power switch Q1. The AND gate AND generates an H-level pulse signal during an ON period of Q1 while the output voltage of the comparator COMP is at the H level. The pulse signal is added to a gate of the switching element Q3 through the capacitor C8 and the pulse transformer T2 to turn the switching element Q3 ON, whereby the multivibrator MV is inverted and the first power switch Q1 is turned OFF. The pulse transformer T2 corresponds to the timing signal transmitter that transmits a timing signal of inverting the output of the comparator COMP from the L level to the H level, from the secondary side to the primary side of the control circuit. The diode D3 resets an exciting state of the pulse transformer T2 that occurred after a pulse signal transmission.

When the zero-voltage detection circuit ZVdt detects a zero voltage state, the first power switch Q1 is turned ON. When the voltage Vo, which is to be input to the comparator COMP and substantially proportional to the output voltage, exceeds the voltage (reference voltage) of the reference voltage source Vref, the first power switch Q1 is turned OFF. With this operation, the duty ratio (on-duty ratio) is controlled while the zero voltage switching is maintained, whereby the output voltage of the converter is stabilized to a substantially constant value.

In the isolated switching power supply apparatus 102 illustrated in FIG. 4, since an output voltage variation of the converter is instantly reflected in an OFF timing of the first power switch Q1, transient responsiveness is excellent as in hysteresis control. In addition, since the slope of a ramp wave during an ON period of the first power switch Q1 has a proportional relationship to the input voltage, a feedforward effect with respect to an input voltage variation is produced, thereby improving the responsiveness, output voltage accuracy and noise resistance.

Third Preferred Embodiment

Figure 6:
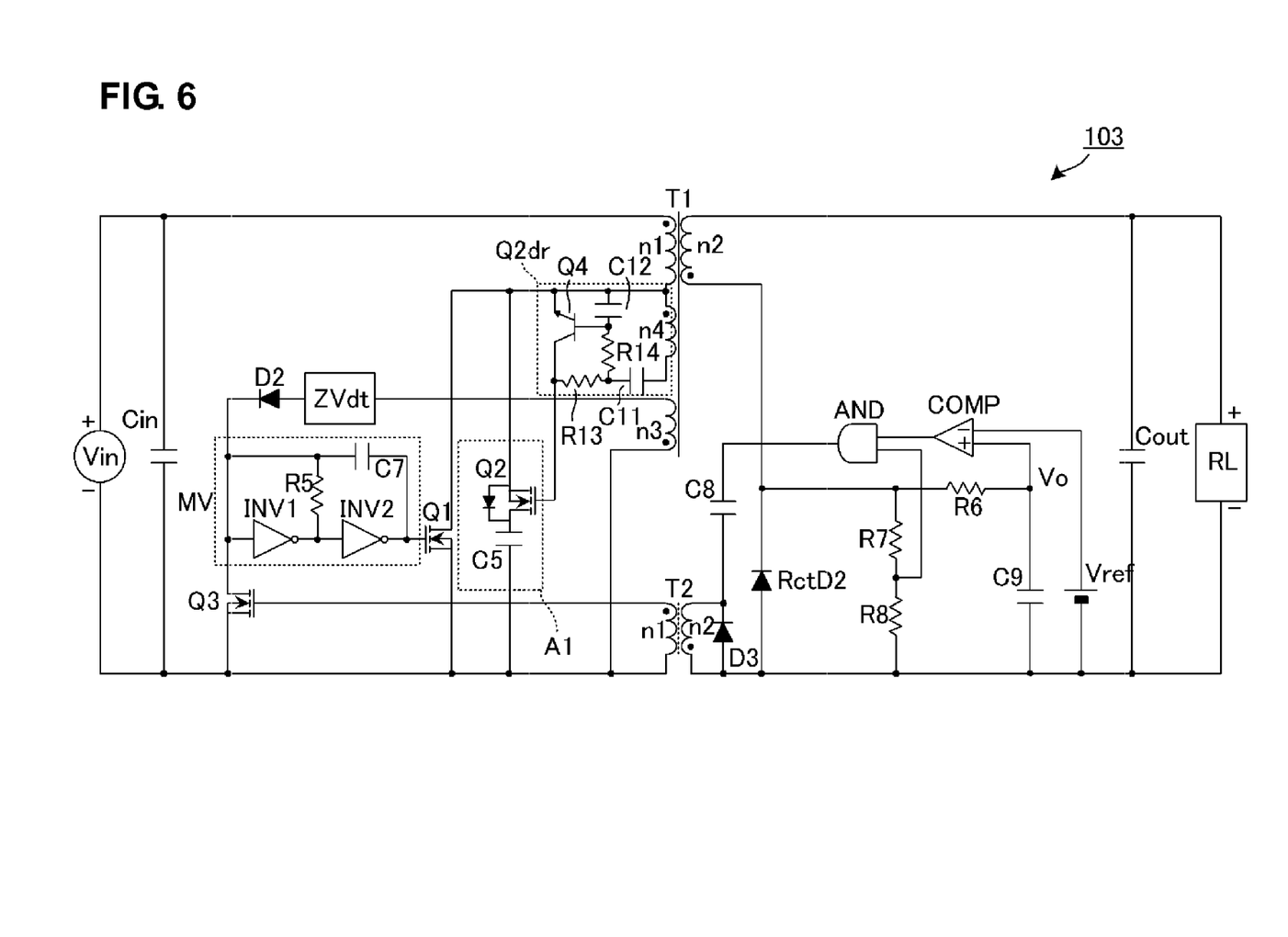
FIG. 6 is a circuit diagram of an isolated switching power supply apparatus 103 according to a third preferred embodiment of the present invention.

FIG. 6 is a circuit diagram of an isolated switching power supply apparatus 103 according to a third preferred embodiment.

In this isolated switching power supply apparatus 103, the voltage clamp circuit A1 including the second power switch Q2 and the clamp capacitor C5 is connected in parallel to the first power switch Q1. Other configurations are the same as those in FIG. 4.

In this way, connecting the voltage clamp circuit A1 in parallel to the first power switch Q1 also produces the same functional effect as in the case of the second preferred embodiment.

Fourth Preferred Embodiment

Figure 7:
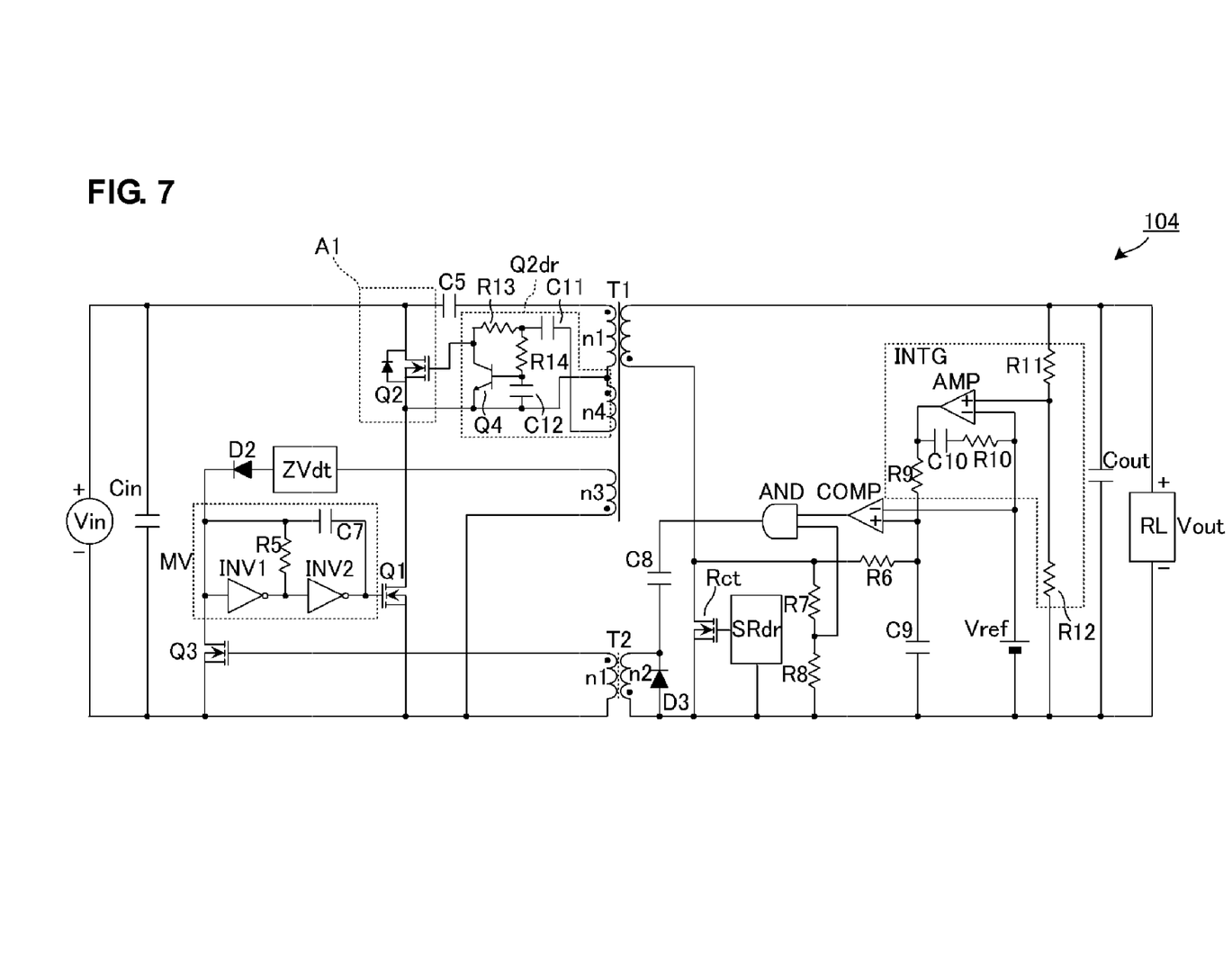
FIG. 7 is a circuit diagram of an isolated switching power supply apparatus 104 according to a fourth preferred embodiment of the present invention.

FIG. 7 is a circuit diagram of an isolated switching power supply apparatus 104 according to a fourth preferred embodiment. FIGS. 8A-8M are waveform diagrams for each section thereof.

The isolated switching power supply apparatus 104 in FIG. 7 forms an ON/OFF type isolated DC-DC converter (flyback DC-DC converter). The isolated switching power supply apparatus 104 is connected to a DC input power supply Vin and supplies a predetermined constant voltage to a load RL.

A power converting section of the isolated switching power supply apparatus 104 includes an input smoothing capacitor Cin, a first power switch Q1, a second power switch Q2, a clamp capacitor C5, a main transformer T1 for power transmission, a synchronous rectifier Rct forming a rectifier, and an output smoothing capacitor Cout forming a smoothing circuit.

A control section of the isolated switching power supply apparatus 104 includes a Q2 driving circuit Q2dr, a zero-voltage detection circuit ZVdt, diodes D2 and D3, a multivibrator MV, inverters INV1 and INV2, capacitors C7, C8, C9 and C10, resistors R5, R6, R7, R8, R9, R10, R11 and R12, a switching element Q3, a pulse transformer T2 for timing signal transmission, a synchronous rectifier driving circuit SRdr, an AND gate AND, a comparator COMP, a reference voltage source Vref, a ramp wave correction circuit INTG, and an error amplifier AMP.

Next, a circuit operation of the isolated switching power supply apparatus 104 illustrated in FIG. 7 is described with reference to FIGS. 8A-8M.

A power conversion section of the isolated switching power supply apparatus 104 defines an asymmetric-control half-bridge converter. That is, the first power switch Q1 and the second power switch Q2 are connected in series to the DC input power supply Vin, and a series circuit having the primary coil n1 of the main transformer T1 and the clamp capacitor C5 is connected between the node between the first power switch Q1 and the second power switch Q2, and the DC input power supply Vin.

A DC current input from the DC input power supply Vin is converted into an AC power by a switching operation performed at a complementary timing between the first power switch Q1 and the second power switch Q2. When the first power switch Q1 is turned ON, a current which increases in a linear fashion in a path from Vin (+)terminal, C5, n1 of the main transformer T1, Q1, and to Vin (−)terminal flows (see FIG. 8C), and electromagnetic energy is stored in an exciting inductance of the main transformer T1.

Figure 8A:
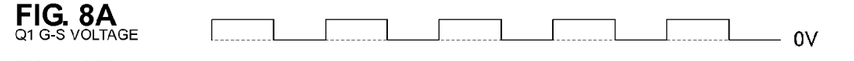
FIGS. 8A-8M are waveform diagrams for each section of the isolated switching power supply apparatus 104 according to the fourth preferred embodiment of the present invention.
Figures 8B, 8C:
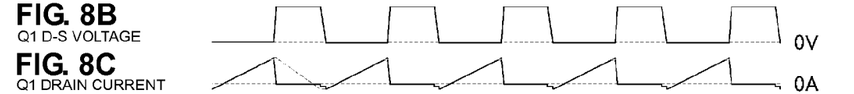
Figures 8D, 8E, 8F:
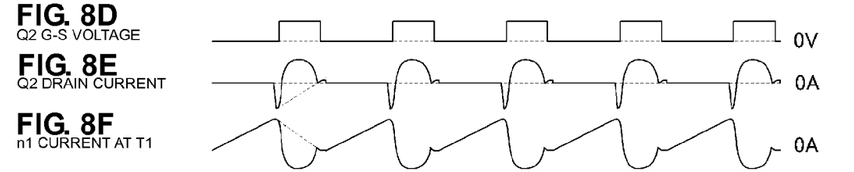
Figures 8G, 8H:
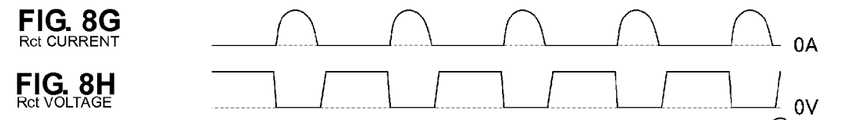
Figures 8I, 8J:
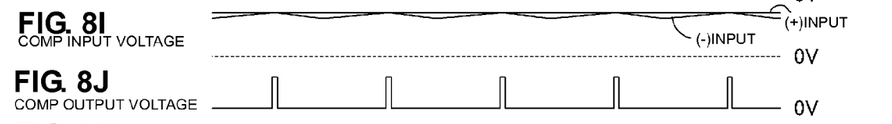
Figures 8K, 8L:
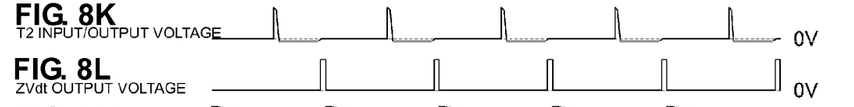
Figure 8M:
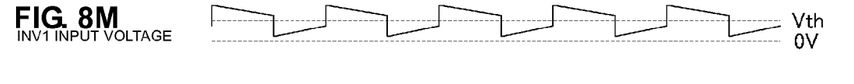

When the first power switch Q1 is turned OFF, the D-S voltage of Q1 and the voltage of the main transformer T1 are reversed as illustrated in FIGS. 8B and 8H, and a parasitic diode of the second power switch Q2 and the synchronous rectifier Rct conduct to each other. The total exciting current of the main transformer T1 decreases in a linear fashion as illustrated in FIGS. 8C, 8E and 8F as dashed lines. However, since the exciting current is divided between the second power switch Q2 and the synchronous rectifier Rct, the respective currents have waveforms illustrated in FIGS. 8E and 8G.

Through the synchronous rectifier Rct, the electromagnetic energy stored in the main transformer T1 is smoothed by the output smoothing capacitor Cout, converted into a DC power, and supplied to the load RL.

With the complementary switching operation between the first power switch Q1 and the second power switch Q2, negative charges, with Vin (+)terminal side being (+) and the primary coil side of the main transformer T1 being (−), are accumulated in the clamp capacitor C5, and the clamp capacitor C5 behaves as a pseudo DC voltage source.

In the control section on the primary side, the inverters INV1 and INV2, the capacitor C7 and the resistor R5 constitute the multivibrator MV. With an oscillation operation of this multivibrator MV, the first power switch Q1 is driven. The zero-voltage detection circuit ZVdt connected to a third coil n3 of the main transformer T1 generates a trigger signal illustrated in FIG. 7 when detecting a zero voltage state or a near-zero voltage state (quasi-zero voltage state) that occurred after all the electromagnetic energy stored in the main transformer has been released. This trigger signal is added to an input of INV1 of the multivibrator MV through the diode D2, thereby inverting the multivibrator MV to turn the first power switch Q1 ON.

When a period of the resonance between the exciting inductance of the main transformer T1 and the parasitic capacitance existing parallel to the first power switch Q1 is denoted as Tr, a voltage at both ends of the first power switch Q1 becomes minimum after ¼Tr seconds after an output voltage of the third coil n3 of the main transformer T1 has decreased to AC 0 V. Therefore, when the first power switch Q1 is turned ON after a delay time corresponding to ¼Tr has elapsed after an AC 0 V state detection, zero voltage switching or quasi-zero voltage switching can be realized.

The main transformer T1 is provided with a fourth coil n4 corresponding to the "switching element driving wiring" according to a preferred embodiment of the present invention. A voltage of this fourth coil n4 is applied to the Q2 driving circuit Q2dr corresponding to the "switching element driving circuit" according to a preferred embodiment of the present invention. The Q2 driving circuit Q2dr includes a delay circuit defined by a series circuit that includes a resistor R13 and a capacitor C11 connected in series to the fourth coil n4, a transistor Q4 which is a switching element that turns OFF the second power switch Q2, and a time constant circuit that includes a resistor R14, which is an impedance circuit connected to a control terminal (base) of the transistor Q4, and a capacitor C12, which is charged and discharged.

The Q2 driving circuit Q2dr performs control so as to turn ON Q2 immediately after the transformer voltage of the main transformer T1 is reversed, and turn OFF when a current flowing through the second power switch Q2 becomes zero or near zero after a certain period of time after the turning ON. This causes the switching element Q2 to perform a zero-current turn-off operation, thereby reducing both a switching loss and a switching surge occurring at the turnoff time.

The Q2 driving circuit Q2dr can be configured with a simple driving circuit since there is no need to exchange signals with a circuit that drives the first power switch Q1.

On the other hand, in the control section on the secondary side, a voltage at both ends of the synchronous rectifier Rct is integrated through the resistor R6 and the capacitor C9, and the integrated voltage Vo is input to a (+)input of the comparator COMP. The integrated voltage contains a ramp wave shaped ripple. The average value of the integrated voltage is a value obtained by subtracting a voltage drop caused by the secondary coil n2 of the transformer T1 from the output voltage of the converter, thus is a "voltage substantially proportional to the output voltage", and includes a ramp wave component which gradually increases during an ON period of the first power switch Q1 and gradually decreases during an OFF period of the first power switch Q1.

The integrated voltage is compared with the voltage (reference voltage) of the reference voltage source Vref by the comparator COMP. When the integrated voltage is larger than the reference voltage, as illustrated in FIG. 7, the output voltage of the comparator COMP becomes the H level. When the integrated voltage is smaller than the reference voltage, the output voltage of the comparator COMP becomes the L level.

A voltage obtained by dividing the voltage between both ends of the synchronous rectifier Rct by the resistors R7 and R8 is a voltage signal used to detect an ON period of the first power switch Q1. The AND gate AND generates an H-level pulse signal during an ON period of Q1 while the output voltage of the comparator COMP is at the H level. The pulse signal is added to a gate of the switching element Q3 through the capacitor 8 and the pulse transformer T2 to turn the switching element Q3 ON, whereby the multivibrator MV is inverted and the first power switch Q1 is turned OFF. The pulse transformer T2 corresponds to the timing signal transmitter that transmits a timing signal of inverting the output of the comparator COMP from the L level to the H level, from the secondary side to the control circuit on the primary side. The diode D3 resets an exciting state of the pulse transformer T2 that occurred after a pulse signal transmission.

When the zero-voltage detection circuit ZVdt detects a zero voltage state, the first power switch Q1 is turned ON. When the voltage Vo, which is to be input to the comparator COMP and substantially proportional to the output voltage, exceeds the voltage (reference voltage) of the reference voltage source Vref, the first power switch Q1 is turned OFF. With this operation, the duty ratio (on-duty ratio) is controlled while the zero voltage switching is maintained, whereby the output voltage of the converter is stabilized to a substantially constant value.

Since an output voltage variation of the converter is instantly reflected in an OFF timing of the first power switch Q1, transient responsiveness is excellent as in hysteresis control. In addition, since the slope of a ramp wave during an ON period of the first power switch Q1 has a proportional relationship to the input voltage, a feedforward effect with respect to an input voltage variation is produced, thereby improving the responsiveness, output voltage accuracy and noise resistance.

The synchronous rectifier Rct is a synchronous rectifier including a MOSFET, and driven by the synchronous rectifier driving circuit SRdr. The synchronous rectifier driving circuit SRdr needs only to turn ON the synchronous rectifier Rct immediately after the transform voltage of the main transformer T1 is reversed and turn OFF the synchronous rectifier Rct after a certain time has elapsed after the turning ON, and thus the same circuit configuration as the Q2 driving circuit Q2dr can be applied thereto.

In the control using the comparator of a preferred embodiment of the present invention, since the amplitude of a ramp wave to be superposed on a voltage substantially proportional to the output voltage or the reference voltage is changed due to variations in an input voltage and an output current, the output voltage slightly varies accordingly. If the amplitude of a ramp wave is reduced, the output voltage accuracy is improved, but at the same time, the noise resistance is reduced. Therefore, there is a limitation to reduce the amplitude (ripple) of a ramp wave. In a case where a required output voltage accuracy cannot be ensured in the control using the comparator, an integration correction device that moderately corrects a deviation between an output voltage and a target value to improve a static output voltage accuracy may be provided.

The ramp wave correction circuit INTG provided in the isolated switching power supply apparatus 104 illustrated in FIG. 7 is a circuit that corresponds to the integration correction device described above. In the ramp wave correction circuit INTG, an error amplifier AMP amplifies the difference between a converter output voltage divided between the resistors R11 and R12 and the reference voltage, and the resultant is superposed on a (+)input voltage of the comparator COMP. This improves a static output voltage accuracy. That is, since an error voltage, which is proportional to the difference between the output voltage and the reference voltage, is superposed on a ramp wave, an effect is produced in a direction in which the error voltage decreases, whereby the output voltage accuracy is improved.

Meanwhile, a negative feedback circuit having the capacitor C10 and the resistor R10 connected in series is connected between a (−)input and an output of the error amplifier AMP. This causes the effect of the error amplifier AMP to be limited to only in a low frequency range which is lower than a phase crossover frequency of which the phase is delayed by 180 degrees, thereby preventing unnecessary responses.

Meanwhile, the present invention is not limited to the preferred embodiments described above, and various applications are conceivable. For example, other power conversion topologies, such as a Cuk converter, can be applied in the power conversion section. In addition, instead of obtaining an output proportional to an output voltage directly from the converter, a voltage that has been rectified and smoothed by the third coil of the main transformer provided on the primary side can be used. Furthermore, a circuit configuration in which the comparing device is embedded in the control circuit on the primary side may be used. Furthermore, the comparing device may include a differential transistor instead of a comparator.

In the preferred embodiments of the present invention described above, a ramp wave is preferably formed by integrating the voltage of the main transformer or the voltage of the rectifier. However, a ramp wave may be formed by using other methods. In addition, in the preferred embodiments, a switching frequency preferably varies depending on an input/output condition. However, a circuit operation at a fixed switching frequency can be performed by providing a fixed frequency oscillation circuit in the primary control circuit, and by determining an ON timing of the power switch Q1 by the fixed frequency oscillation circuit and determining an OFF timing thereof by the comparing device. Furthermore, although the preferred embodiments preferably use "constant value control" to produce a constant output voltage that is a target value, the preferred embodiments may use "tracking control" that changes a target value over time.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An isolated switching power supply apparatus having a main transformer including a primary coil and a secondary coil and that transmits a power from a primary side to a secondary side;
   at least one power switch that is connected in series to the primary coil of the main transformer and that interrupts a current flowing from a DC input power supply to the primary coil of the main transformer;

a rectifier that rectifies a voltage generated in the secondary coil of the main transformer; and a smoothing circuit that smoothes the voltage rectified by the rectifier; wherein energy is stored in the main transformer during an ON period of the power switch and the stored energy is released to the secondary side during an OFF period of the power switch;

the isolated switching power supply apparatus comprising:

a ramp wave generating circuit that generates a ramp wave based on a change of magnetic flux generated in the main transformer;

a comparing device that compares a reference voltage on which the ramp wave is superposed with an output voltage which has been smoothed by the smoothing circuit, and outputs a timing signal to invert a magnitude relation;

a timing signal transmitter that transmits the timing signal output from the comparing device from the secondary side to the primary side; and a switching controller that controls a turn-off timing of the power switch by using the timing signal transmitted by the timing signal transmitter to control an ON time of the power switch.

2. The isolated switching power supply apparatus according to claim 1, wherein the timing signal transmitter is a pulse transformer including a primary coil and a secondary coil.

3. The isolated switching power supply apparatus according to claim 1, wherein the ramp wave generating circuit is an integrating circuit that integrates the voltage generated in the secondary coil of the main transformer or a voltage generated between both ends of the rectifier.

4. The isolated switching power supply apparatus according to claim 1, further comprising a ramp wave correction circuit that generates an error amplification signal by amplifying an error voltage between the output voltage of the smoothing circuit and a predetermined reference voltage and superposes the error amplification signal on the ramp wave generated by the ramp wave generating circuit.

5. The isolated switching power supply apparatus according to claim 1, wherein the switching controller includes a zero voltage switching control element that detects a timing at which a voltage between both ends of the power switch decreases to zero voltage or near zero voltage after the power switch has been turned OFF and the electromagnetic energy stored in the main transformer has been released, and turns the power switch ON.

6. The isolated switching power supply apparatus according to claim 1, wherein a series circuit including a capacitor and a switching element including a control terminal is connected in parallel to the primary coil of the main transformer or the power switch, and a voltage clamp circuit is provided that repeatedly turns ON and OFF in a complementary manner with an OFF period of both the power switch and the switching element therebetween and, immediately after the power switch is turned OFF, absorbs a surge voltage generated between main current carrying terminals of the power switch with the capacitor to regenerate the absorbed energy.

7. The isolated switching power supply apparatus according to claim 6, wherein the capacitor included in the series circuit is connected in series to the primary coil of the main transformer, and is repeatedly charged and discharged, or discharged and charged, in synchronization with an ON/OFF operation of the switching element.

8. The isolated switching power supply apparatus according to claim 6, wherein the main transformer is provided with a switching element driving wiring, and the switching controller is provided with a switching element driving circuit that inputs a voltage generated in the switching element driving wiring, the voltage being substantially proportional to the voltage generated in the primary coil, to the switching element including the control terminal to control ON/OFF thereof.

9. The isolated switching power supply apparatus according to claim 8, wherein the switching element driving circuit includes:

an additional switching element arranged to turn the switching element including the control terminal OFF; and a time constant circuit that performs control so that the switching element including the control terminal is turned OFF by the additional switching element after a certain time elapses after a voltage substantially proportional to a voltage of the primary coil which turns the switching element including the control terminal OFF has been generated in the switching element driving wiring.

10. The isolated switching power supply apparatus according to claim 9, wherein the additional switching element includes a transistor, the transistor is connected to the control terminal of the switching element including the control terminal, and an impedance circuit and a capacitor constituting the time constant circuit are connected to a control terminal of the transistor.

11. The isolated switching power supply apparatus according to claim 1, wherein the rectifier is a switching element that is switched by a control signal.

* * * * *